July 17, 1951  F. D. JONES ET AL  2,560,726
CONTROLLED CASTER WHEEL FOR AGRICULTURAL IMPLEMENTS
Filed Aug. 27, 1948  3 Sheets-Sheet 1
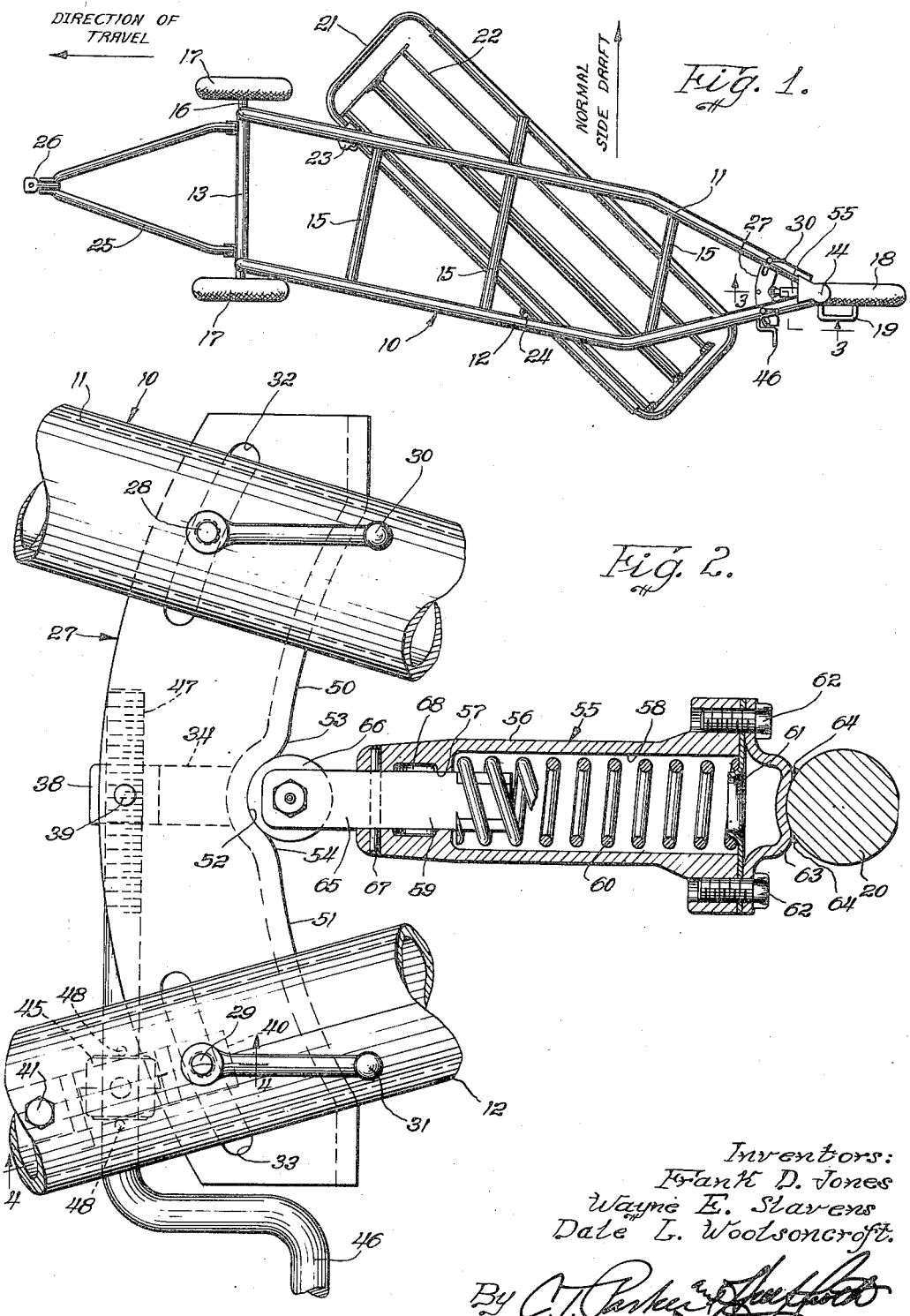
Inventors:
Frank D. Jones
Wayne E. Stavens
Dale L. Woolsoncroft
By C. T. Parker
Attys

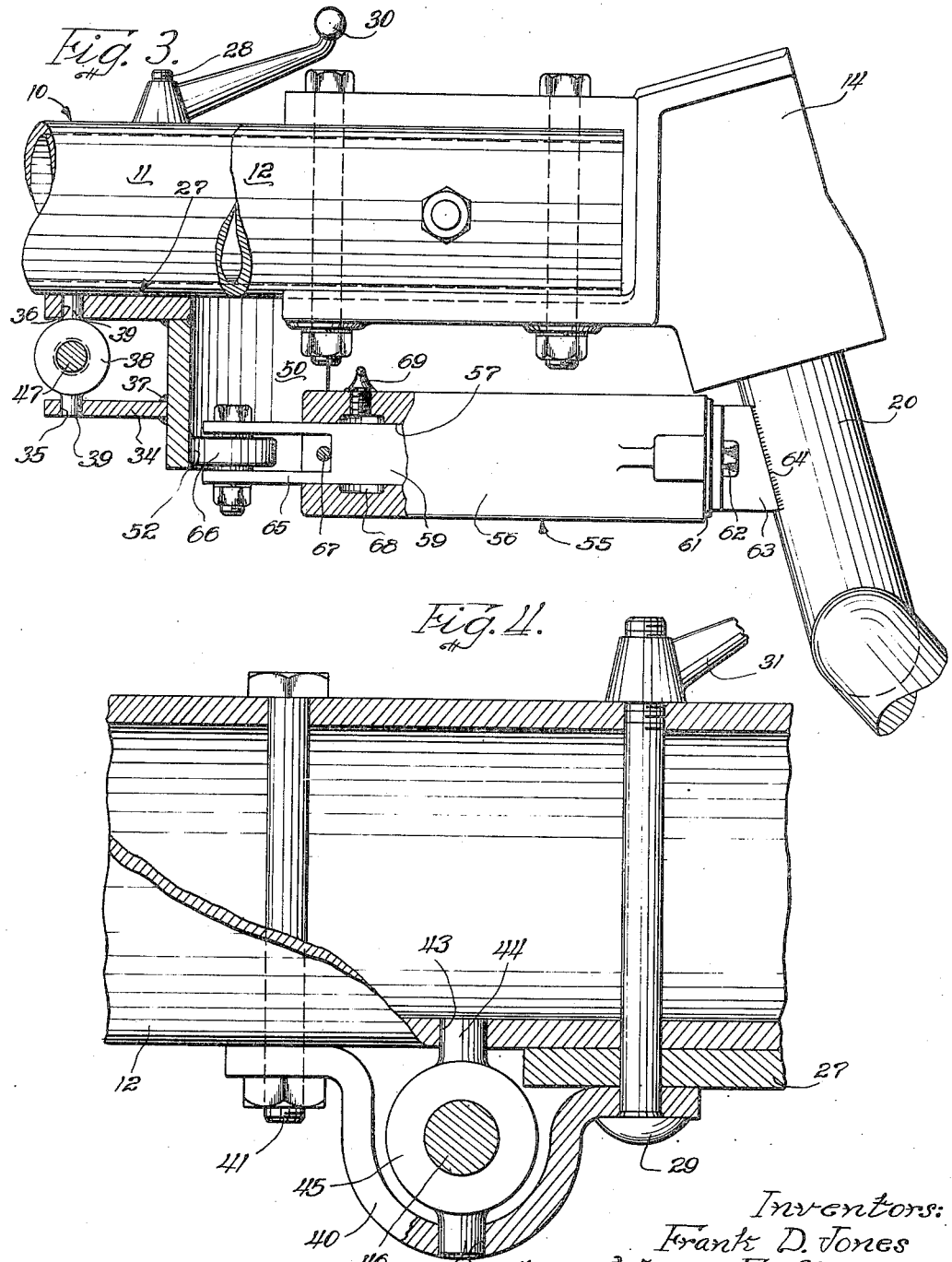

July 17, 1951  F. D. JONES ET AL  2,560,726
CONTROLLED CASTER WHEEL FOR AGRICULTURAL IMPLEMENTS
Filed Aug. 27, 1948  3 Sheets-Sheet 3
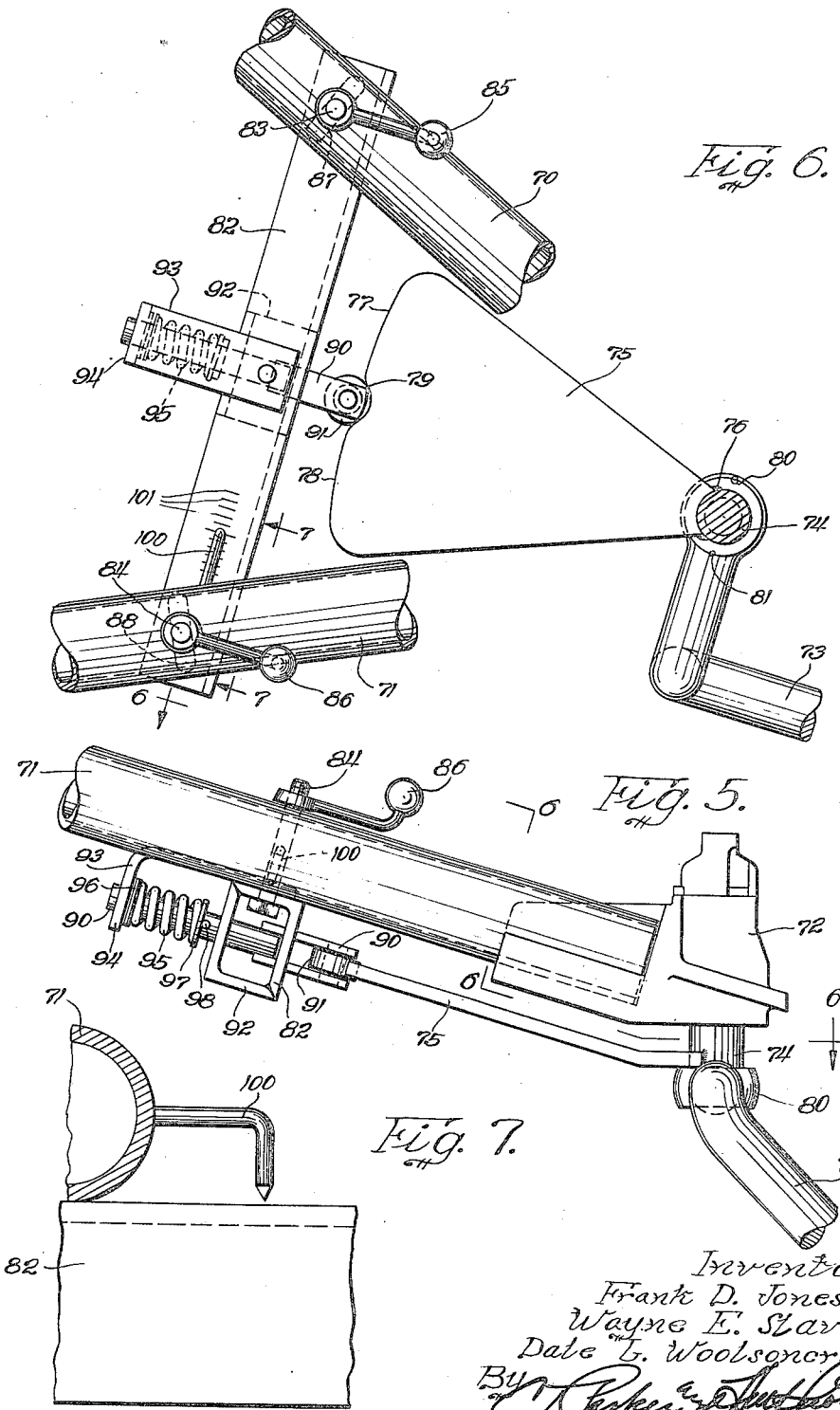
Inventors:
Frank D. Jones
Wayne E. Slavens
Dale G. Woolsoncroft
By C. T. Parker
Attys Patented July 17, 1951

2,560,726

UNITED STATES PATENT OFFICE 2,560,726

CONTROLLED CASTER WHEEL FOR AGRICULTURAL IMPLEMENTS

Frank D. Jones and Wayne E. Slavens, Des Moines, and Dale L. Woolsoncroft, Ankeny, Iowa, assignors to Deere Manufacturing Co., Dubuque, Iowa, a corporation of Iowa Application August 27, 1948, Serial No. 46,454

15 Claims. (Cl. 56—321)

This invention relates to an agricultural implement or vehicle, and more particularly to means for controlling the caster wheel support of a mobile frame.

Many mobile agricultural implements, of which the side delivery rake is typical, are propelled by a tractor or other draft source in such manner that the implement is subjected to considerable side draft. As is well known, this side draft is due to a lateral offset between the hitch points between the tractor and implement and the point on the implement on which the load is imposed in greatest magnitude. In a side delivery rake, the main supporting frame for the rake is normally disposed in such manner as to trail longitudinally behind the propelling source, but the reel frame and the revolving reel carried thereby operate at an angle to the line of draft for the purpose of raking and delivering hay or other crops to one side of the machine. Consequently, the rake frame has a tendency to swing about its hitch point in a direction opposite to the direction in which the hay or other crop is being delivered into a windrow. The usual tractor-drawn side delivery rake comprises a pair of laterally spaced apart forward wheels for supporting the forward end of a generally longitudinally extending rake frame which has its rear end supported on a trailing caster wheel. The forward end of the frame is connected by a single point of draft connection to the tractor or similar propelling source and heretofore the caster wheel has been uncontrolled so that it would be free to oscillate about a vertical axis as the rake frame tended to swing about the vertical axis of the hitch connection.

According to the present invention, control means is provided for the caster wheel and this means preferably takes the form of a pair of releasably interlocking elements, one carried by the caster wheel and the other carried by the implement or rake frame. The parts are normally interlocked by yieldable means which operate to hold the caster wheel in straight-ahead position except when the caster wheel is subjected to side pressures in excess of a predetermined value.

Another object of the invention is to provide means for adjusting the angularity of the caster wheel with respect to the rake frame, preferably by adjusting laterally the point at which the releasable parts interlock. In this respect, a further object is to provide convenient and efficient means for accomplishing this adjustment.

The usual side delivery rakes operate to deliver hay or other crops to form a windrow to the left side of the machine, as viewed from a position behind the machine and looking forwardly. Consequently, the tendency of the rear end of the rake frame is to swing to the right. According to the present invention, the releasable parts are so constructed and arranged as to require greater side pressure to release the parts for castering of the wheel to the right than the side pressure required for releasing the wheel for castering to the left. In the operation of the rake, turns at the end of the field will be made to the right and the side pressure on the caster wheel will naturally be to the left, or in the direction of easier release of the interlocking parts.

Aside from the foregoing and other objects and advantages of the invention in normal operation of the rake, there are additional advantages obtained in transporting the rake at high speeds, inasmuch as the interlocking parts between the frame and caster wheel prevent swaying of the machine from side to side. This arrangement contributes materially to the safety of both the machine and the operator in the transporting of the machine at high speeds over paved highways or even at slower speeds over rough fields and in going from one field to another.

The foregoing and other important objects and desirable features inherent in and encompassed by the invention will become apparent to those skilled in the art as a detailed disclosure is made in the following specification of two preferred forms of the invention as illustrated in the accompanying sheets of drawings in which:

Figure 1 is a top plan view of a mobile agricultural implement as exemplified by a side delivery rake of the type that is towed behind a tractor;

Figure 2 is an enlarged fragmentary view, partly in section, of the rear portion of the rake frame including the interlocking parts between the frame and the caster wheel;

Figure 3 is a fragmentary enlarged view, partly in longitudinal section as viewed along the line 3—3 of Figure 1;

Figure 4 is an enlarged fragmentary sectional view as viewed along the line 4—4 of Figure 2;

Figure 5 is a side elevational fragmentary view of a modified form of the invention;

Figure 6 is a plan view, partly in section, of the structure shown in Figure 5, as viewed along the line 6—6 of Figure 5; and Figure 7 is an enlarged sectional view taken along the line 7—7 of Figure 6.

Figures 1–4

The general construction of the implement as exemplified by the side delivery rake shown in Figure 1 includes a generally longitudinally extending frame designated by the numeral 10. This frame comprises a right hand longitudinal frame bar 11 and a left hand longitudinal frame bar 12. The bars are cross connected at their forward ends by a transverse frame member 13 and the bars converge at their rear ends and are assembled with a casting 14 which provides part of supporting means for the rear end of the frame, as will appear below.

The frame bars 11 and 12 are cross braced intermediate their front and rear ends by a plurality of transverse members 15. The frame 10 is arched intermediate its front and rear ends so that the frame bars 11 and 12 are disposed at a considerable height above the ground, the rake in this respect being of conventional design. The forward end of the frame 10 is carried on a rolling ground support comprising a transverse axle 16 and a pair of laterally spaced ground wheels 17. The ground-engaging means for support of the rear end of the frame 10 includes a single caster wheel 18 carried on an axle 19 which includes a substantially upright or vertical standard or post 20. The post may be journaled in the casting 14 by any appropriate bearing, the details of which are not important here and have not been shown.

The rake frame 10 has suspended below it a diagonally arranged reel frame 21 within which is supported a rotatable reel 22. The reel frame 21 is pivotally supported at 23 and 24 on the rake frame 10 and may be additionally and adjustably supported by other means omitted here because they form no part of the present invention. The forward end of the frame 10 is connected to a forwardly extending hitch frame 25 preferably comprising a pair of forwardly converging bars connected to a clevis 26 by means of which a hitch connection may be made to a tractor or other source of draft power. Arrows and legends have been used in Figure 1 to designate the direction of travel of the rake and the imposition of side draft during normal straight-ahead operation.

In the form of the invention shown in Figures 1–4, the control means for the caster wheel 18 comprises fundamentally a pair of releasably interlocked members operating between the rake frame 10 and the caster wheel 18. As best shown in Figure 2, one of the members is a transverse arcuate member 27 preferably in the form of a weld-fabricated angle bar (Figure 3). This member is secured at its opposite ends respectively to the frame bars 11 and 12 of the rake frame 10, the securing being preferably accomplished by bolts 28 and 29 and tail nuts 30 and 31. The frame bars 11 and 12 are respectively vertically apertured to receive the bolts 28 and 29 and opposite ends of the arcuate member 27 are slotted at 32 and 33; and the bolts 28 and 29 pass respectively through the slots. The member 27 is disposed just forwardly of the caster wheel standard or post 20 and the slots 32 and 33 are formed on an arc having the vertical axis of the standard 20 as its center. The arrangement is such that the lateral position of the member 27 on the frame 10 may be changed by loosening the tail nuts 30 and 31, shifting the member 27 and then retightening the tail nuts.

It is one of the features of this form of the invention to provide convenient means for accomplishing this adjustment. For this purpose, a central portion of the member 27 includes a mounting lug 34 (Figure 3) spaced below an intermediate portion of the horizontal part of the member and apertured at 35 below and in vertical alignment with an aperture 36 in a central portion of the member 27. The lug 34 is rigidly secured to the member 27, as by welding at 37. An internally threaded member in the form of a cylindrical nut 38 is provided with a pair of diametrically opposed trunnions 39 which are received in the apertures 35 and 36.

The left hand frame bar 12 (Figure 4) carries at its underside a bracket 40 which is secured to the member 12 by the bolt 29 and a second bolt 41. As best shown in Figure 2, the bracket 40 is in transverse alignment with the adjusting nut 38 and the bracket and the under portion of the frame bar 12 are apertured in vertical alignment at 42 and 43 to receive trunnions 44 which are formed on a collar 45. An adjusting crank 46 is provided with an externally threaded straight portion 47 which is received by the nut 38. The unthreaded portion of the straight part of the crank is journaled in the collar 45 and pins 48 are carried by the crank at each side of the collar to preclude axial shifting of the crank with respect to the collar. It will thus be seen that turning of the crank 46 will result in shifting of the member 27 after the tail nuts 30 and 31 have been loosened.

The vertical or depending flange portion of the member 27 comprises an arcuate track having a pair of arcuate portions 50 and 51 which are separated by an arcuate notch 52. Although both arcuate track portions 50 and 51 are formed about the substantially vertical axis of the caster wheel standard 20 as a center, the radius of the track portion 50 is somewhat shorter than that of the track portion 51. The arcuate notch 52 forms a junction at 53 with the arcuate track portion 50 and, at its other side, the notch 52 forms a junction at 54 with the other track portion 51. The notch and its junctions 53 and 54 with the track provide part of cam means cooperative with another cam part to be described below. The radius of the junction or corner 53 is somewhat sharper than the radius of the corner or junction 54. The purposes of the particular design of the track portions 50 and 51 and notch 52 will appear below.

The other member of the two that comprise the interlocking means between the frame 10 and caster wheel 18 is designated generally by the numeral 55 and includes an internally recessed part 56 which extends forwardly from the caster wheel standard 20 substantially as a radius thereof toward the notch 52 in the transverse arcuate member 27. The internal recessing of the part 56 is accomplished by a first bore 57 and a counterbore 58. The bore 57 carries for longitudinal or axial sliding therein a plunger 59 which has its inner end extending into the counterbore 58 and secured to the forward end of a compression spring 60. The rear end of the spring 60 is seated on a spring seat 61 secured to the part 56 by a pair of cap screws 62 which pass also through an apertured clip or bracket 63. The clip is rigidly secured to the caster wheel standard 20, as by welding at 64 (Figure 2). The member 55 is thus rigidly carried by the caster wheel standard.

The plunger 59 is preferably square in cross section, as is the bore 57, and the plunger is thus prevented from rotating in the part 56. The outer or forward part of the plunger 59 is bifurcated or slotted at 65 (Figure 3) and carries a roller 66. This roller provides a cam part cooperative with the cam part 52—53—54 and, in the normal or straight-ahead relationship of the members 27 and 55, the roller 66 interfits with the notch 52 and thus the members operate under the spring loading of the spring 60 to keep the members releasably interlocked. As best shown in Figure 3, a pin 67 is passed transversely through the part 56 and through the bifurcated portion 65 of the plunger 59. The pin 67 thus serves to limit forward movement of the plunger 59 under action of the spring 60. The bore 57 may be provided at its forward end with means for supplying lubricant to the plunger 59, this means in the present case including an annular recess 68 to which lubricant may be supplied by a conventional lubricant fitting 69.

The members 27 and 55 are relatively adjusted so that the notch 52 is substantially centrally ahead of the caster wheel standard or post 20, this position of the parts being that for straight-ahead travel of the rake frame under normal conditions. Inasmuch as the arcuate corner or junction 53 between the notch 52 and the right hand arcuate track 50 is relatively sharp, side pressures tending to turn the caster wheel 18 about the substantially vertical axis of the standard 20 in one direction must be somewhat greater than side pressures from the opposite direction. It will be noted that normal side draft on the rake frame will tend to release the interlock between the members 27 and 55 so that the caster wheel may swing freely to the right, or in a clockwise direction, as viewed in Figures 1 and 2. In instances in which the crop is particularly heavy, the side draft will naturally increase and release of the caster wheel may occur frequently with the members set as shown in the drawings. To overcome this difficulty, the member 27 may be adjusted a desired amount to the left, thus setting the plane of the caster wheel 18 at a slight angle to a longitudinal vertical plane passed through the axis of the caster wheel standard 20. The caster wheel, thus set, will thus have a greater tendency to keep the frame 10 from swinging to the right and side pressures on the caster wheel, effective to release the interlock between the members 27 and 55, will have to be correspondingly greater.

On the other hand, adjustment of the member 27 to the right will result in angling of the caster wheel 18 to the right, or in the direction of normal side draft imposed on the machine, whereupon it will be found that the raking width of the implement may be narrowed. These adjustments are conveniently accomplished by the simple expedient of loosening the tail nuts 30 and 31, rotating the crank 46 in the desired direction, and securing the adjustment by tightening the tail nuts.

Inasmuch as the radius of the arcuate track 50 is somewhat shorter than that of the arcuate track 51, release of the roller 66 for swinging of the caster wheel 18 and member 55 to the right will impose upon the spring 60 a greater loading than imposed upon the spring in release and swinging of the member 55 to the left, as a result of which the member 55 will more easily be returnable to its central or interlocking position. That is to say, when the member 55 is released for swinging to the right, it must, in order to return to central position, overcome the side draft on the machine. Therefore, the radius of the arcuate track 50 is made shorter so that the spring 60 is more heavily loaded than is required when the member 55 is released to the left, inasmuch as the imposition of normal side draft will tend to return the member 55. The spring 60 is, of course, calibrated with respect to the expected side pressures and the parts are arranged so that the interlock therebetween will release before any of the parts suffer damage.

Figures 5, 6 and 7

In this form of the invention, the basic concept involved in the modification described above is utilized for similar purposes. The construction of this modification may be embodied in the rake frame structure shown in Figure 1 or in a similar structure including right and left frame bars 70 and 71 which converge to the rear to be joined by a casting 72. The casting 72 provides a journal for a caster wheel axle 73 having an upright or vertical standard or post 74. It will be understood, of course, that the axle 73 carries a caster wheel similar to the caster wheel 18.

One of the two members that comprise the releasable interlock between the caster wheel and the rake frame comprising the members 70 and 71 includes a first member 75 of generally triangular shape having its apex portion welded or otherwise rigidly secured at 76 to the caster wheel standard 74. The base portion of the triangular member 75 is in arcuate form comprising a first arcuate track 77 and a second arcuate track 78 separated by an intermediate arcuate notch 79. The radii of the arcuate tracks 77 and 78 are respectively formed about centers offset laterally from the axis of the caster wheel standard 74, as at 80 and 81, the purpose of which will presently appear.

The second member of the releasably interlocked means preferably comprises a transverse angle bar 82 supported at its opposite end by and below the frame bars 70 and 71. The supporting of the opposite ends of the member or bar 82 is accomplished by a pair of bolts 83 and 84 and a pair of cooperating tail nuts 85 and 86, the frame bars 70 and 71 being appropriately apertured and the opposite ends of the member 82 being slotted respectively at 87 and 88. The slots are diagonally disposed with respect to the principal axis of the member 82 and correspond generally in structure and function with the arcuate slots 32 and 33 in the member 27 of the modification described above. The slots and the releasable securing means comprising the bolts 83 and 84 and tail nuts 85 and 86 provide means whereby the member 82 may be adjusted transversely with respect to the frame bars 70 and 71.

The interlock between the members 82 and 75 is accomplished by means including a plunger 90 which carries a roller 91 normally interfitting with the notch 79 in the member 75. For this purpose, an intermediate portion of the member 82 carries an inverted angle bar 92 which is appropriately apertured in alignment with an aperture in the depending flange of the angle bar 82. A forwardly extending clip or bracket 93 has a depending portion 94 which is apertured in longitudinal alignment with the apertured portions of the bars 82 and 92. The plunger 90 is thus axially slidable but non-rotatably carried in the members 82, 92 and 94. A compression spring 95 operates between the clip 93 and plunger 90 to urge the roller 91 into engagement with the notch 79. The spring 95 seats at one end on the outermost of a plurality of shims 96 and at its other end against a washer 97 held in place on the plunger 90 by a pin 98.

Adjustment of the member 82 with respect to the frame bars 70 and 71 may be determined by indicating means comprising a pointer 100 secured to the right hand side of the left hand frame bar 71 and cooperating with a plurality of graduations 101 provided on the upper proximate surface of the member 82.

The general characteristics of the rake equipped with the modified form of the invention shown in Figures 5, 6 and 7 will be the same as those of a rake equipped with the modification shown in Figures 1-4. The lateral offsetting of the centers for the arcuate tracks 77 and 78 with respect to the center of the caster wheel standard 74 will result in increased loading on the spring 95 as the member 75 becomes released for swinging with respect to the roller 91, whereby the members will be more readily restorable to normal or interlocked position.

Adjustment of the spring 95 may be accomplished by removing or adding shims at 96.

*Summary*

Both forms of the invention illustrate preferred means for controlling the caster wheel on an agricultural implement, preferably as exemplified by a side delivery rake. It will be understood, of course, that the principles of the invention may be adapted to other implements, particularly those in which the supporting frame trails behind a tractor or other source of draft power. In any event, the control of the caster wheel is highly advantageous in either normal operating of the implement or in transporting the implement at high speeds over highways. Other advantages of either form of the invention not specifically enumerated above will undoubtedly occur to those versed in the art, as will various modifications and alterations in the preferred forms of the invention illustrated, all of which may be accomplished without departing from the spirit and scope of the invention as defined in the appended claims.

What is claimed is:

1. For a mobile implement having a frame carried for normal travel forwardly over the ground by ground-engaging means at one portion of the frame and at another portion of the frame by a caster wheel provided with a pivot standard for castering of the wheel about a generally vertical axis; caster wheel control means comprising a first member having means for fixed connection to the frame; a second member having means for fixed connection to the caster wheel standard; means yieldably inter-locking said members for holding the caster wheel standard in an operating position against pivoting about its axis when subjected to side pressures below a predetermined magnitude; and means for adjusting one of the members laterally of the frame with respect to the other for selectively shifting the operating position of the caster wheel standard laterally.

2. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising first and second members positionable adjacent the caster wheel standard, one of said members extending transversely of the frame in the form of an arc about the axis of the caster wheel standard and having a notch interrupting said arc, and the other member including a releasable roller engageable with said notch; means for mounting one of said members on the frame, and means for mounting the other member on the caster wheel standard, one of said means including provision for lateral adjustment of one member relative to the other; biasing means operative to hold the releasable roller in engagement with the notch for releasably fixing the caster wheel standard in a normal operating position against lateral swinging about its axis and providing for release of the roller in either lateral direction for rolling over said arc as said caster wheel standard swings to one side or the other in response to side pressure on the caster wheel above a predetermined value; and means for adjusting the adjustably mounted member laterally with respect to the other for varying in either direction the position of inter-engagement between the roller and the notched member.

3. For a mobile implement having a frame carried for normal travel forwardly over the ground by ground-engaging means of one portion of the frame and at another portion of the frame by a caster wheel provided with a pivot standard for castering of the wheel about a generally vertical axis: caster wheel control means comprising first and second members positionable adjacent the caster wheel standard, one of said members extending tranversely of the frame and having a notch interrupting said arc, and the other member including a releasable part engageable with said notch; means for mounting one of said members on the frame, and means for mounting the other member on the caster wheel standard, one of said means including provision for lateral adjustment of one member relative to the other; biasing means operative to hold the releasable part in engagement with the notch for releasably fixing the caster wheel standard in a normal operating position against lateral swinging about its axis and providing for release of the part in either lateral direction as said caster wheel standard swings to one side or the other in response to side pressure on the caster wheel above a predetemined value; and means for adjusting the adjustably mounted member laterally with respect to the other for varying in either direction the position of inter-engagement between the releasable part and the notched member.

4. The invention defined in claim 3, further characterized in that: the notched member is so constructed and arranged with respect to the releasable part as to require greater side pressure on the caster wheel in one lateral direction than in the opposite lateral direction to effect release of said part from the notch.

5. The invention defined in claim 3, further characterized in that: the notched member has an arcuate lateral portion at each side of the notch, each portion being formed generally on a radius about the caster wheel standard axis and one radius being longer than the other.

6. The invention defined in claim 3, further characterized in that: the notched member has an arcuate lateral portion at each side of the notch, said portions being on radii respectively about centers offset laterally each side of the caster wheel standard axis.

7. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising first and second members positionable adjacent the caster wheel standard, one of said members extending transversely of the frame and having a notch interrupting said arc, and the other member including a releasable part engageable with said notch; means for mounting one of said members on the frame, and means for mounting the other member on the caster wheel standard, one of said means including provision for lateral adjustment of one member relative to the other;

biasing means operative to hold the releasable part in engagement with the notch for releasably fixing the caster wheel standard in a normal operating position against lateral swinging about its axis and providing for release of the part in either lateral direction as said caster wheel standard swings to one side or the other in response to side pressure on the caster wheel above a predetermined value; means for adjusting the adjustably mounted member laterally with respect to the other for varying in either direction the position of inter-engagement between the releasable part and the notched member; and gauge means for indicating the amount of relative adjustment between said members.

8. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising an arcuate track member adjacent the caster wheel standard having a pair of arcuate portions formed generally about the standard axis of the caster wheel and separated by a notch substantially centrally thereof; means for adjustably securing the track member to the frame for lateral adjustment to selectively position the notch with respect to a fore and aft vertical plane passed through the caster wheel standard axis; a swingable member having means for connection to the caster wheel standard for swinging therewith and having a movable roller engaging said notch to position the caster wheel with respect to the frame; and spring-pressed means between the roller and the swingable member for urging the roller into the notch.

9. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising an arcuate track member positionable adjacent the caster wheel standard and having a pair of arcuate portions formed generally about the axis of the caster wheel and separated by an arcuate notch substantially centrally thereof, the junction of one end of the arc of the notch with the arc of one track portion being on a radius smaller than the radius at the junction of the other end of the arc of the notch with the arc of the other track portion; means for adjustably securing the track member to the frame for lateral adjustment to selectively position the notch with respect to a fore and aft vertical plane passed through the caster wheel standard axis; a swingable member having means for connection to the caster wheel standard for swinging therewith and having a movable roller engaging said notch to position the caster wheel with respect to the frame; and spring-pressed means between the roller and the swingable member for urging the roller into the notch.

10. For a side delivery rake having a trailing frame including a pair of rearwardly converging frame bars interconnected at their rear ends and supported on a caster wheel standard turnable about a generally vertical axis and including a ground-engaging caster wheel: control means for the caster wheel, comprising a first member positionable transversely across the frame bars ahead of the caster wheel standard; means for mounting said member at its opposite ends on the frame bars and providing for lateral adjustment of the members; a second member having means for connection to the caster wheel standard and projecting forwardly into proximity to the first member; means providing an arcuate track on the first member formed generally about the axis of the caster wheel standard; means providing a longitudinal recess in the second member; a spring-loaded plunger slidably carried in the recess and including a part engaging the arcuate track; and cam means cooperative between the plunger part and the track for generally centering the plunger part and track to hold the caster wheel standard against swinging about its axis until side pressure on the caster wheel overcomes the spring loading on the plunger.

11. The invention defined in claim 10, further characterized in that: the adjustable mounting of the first member on the frame bars includes releasable securing means and laterally arcuate slots.

12. The invention defined in claim 11, further characterized in that: screw-threaded adjusting means is provided for positioning between the first member and at least one of the frame bars to shift the member laterally and arcuately.

13. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising a first member having means for connection to the frame; a second member having means for connection to the caster wheel standard; a spring-loaded part movable on one member toward the other member; and cam means including said spring-loaded part and a cooperating part on the other member normally inter-engageable for holding the caster wheel standard against swinging about its axis and releasable when side pressure on the caster wheel exceeds the effectiveness of the spring-loaded part.

14. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising a first member positionable generally transversely across the frame as respects the line of travel and adjacent the caster wheel standard; means for releasably securing said member to the frame for lateral adjustment thereof; a second member having means for connection to the caster wheel standard and extending in proximity to the first member; cam means including a spring-loaded part on one member and a co-operating part on the other member normally inter-engageable to fix the caster wheel standard against lateral swinging and releasable when side pressure on the caster wheel exceeds the effectiveness of said spring-loaded part; and means for adjusting said frame-mounted member laterally with respect to the frame, comprising a lug on said member, a screw-threaded part carried by the lug, and an adjusting element adapted to be rotatably but non-shiftably carried by the frame and having a screw-threaded portion cooperating with said screw-threaded part.

15. For a mobile implement having a frame carried for normal travel forwardly over the ground by ground-engaging means at one portion of the frame and at another portion of the frame by a caster wheel provided with a pivot standard for castering of the wheel about a generally vertical axis: caster wheel control means comprising a first member positionable generally transversely across the frame as respects the line of travel and adjacent the caster wheel standard; means for releasably securing said member to the frame for lateral adjustment thereof; a second member having means for connection to the caster wheel standard and extending in proximity to the first member; cam means including a spring-loaded part on one member and a co-operating part on the other member normally inter-engageable to fix the caster wheel standard against lateral swinging and releasable when side pressure on the caster wheel exceeds the effectiveness of said spring-loaded part; means for adjusting said frame-mounted member laterally with respect to the frame; and means including adjustment indicating elements carried respectively by the frame and said first member.

FRANK D. JONES.
WAYNE E. SLAVENS.
DALE L. WOOLSONCROFT.

REFERENCES CITED

The following references are of record in the file of this patent:

UNITED STATES PATENTS

| Number | Name | Date |
|---|---|---|
| Re. 12,194 | Lincoln | Jan. 19, 1904 |
| 291,426 | Thompson et al. | Jan. 1, 1884 |
| 419,297 | Thayer | Jan. 14, 1890 |
| 752,742 | Wood | Feb. 23, 1904 |
| 1,118,837 | Bailey | Nov. 24, 1914 |
| 1,285,963 | Estep | Nov. 26, 1918 |
| 1,546,617 | Caldwell et al. | July 21, 1925 |
| 1,651,938 | Wolf | Dec. 6, 1927 |
| 1,896,234 | Hathorn | Feb. 7, 1933 |
| 2,370,355 | Jones | Feb. 27, 1945 |
| 2,396,277 | Ledwin | Mar. 12, 1946 |
| 2,445,865 | Sleeper | July 27, 1948 |

FOREIGN PATENTS

| Number | Country | Date |
|---|---|---|
| 549,773 | Great Britain | Dec. 7, 1942 |